United States Patent [19]

Griverus

[11] 3,861,210
[45] Jan. 21, 1975

[54] FLOW METER PROVIDED WITH AN ORBITING SENSING ELEMENT

[76] Inventor: Tor Lennart Bernt Griverus, Nasbydalsvagen, 183 31 Taby, Sweden

[22] Filed: Oct. 30, 1972

[21] Appl. No.: 302,038

[30] Foreign Application Priority Data
Nov. 10, 1971 Sweden............................ 14334/71

[52] U.S. Cl................................... 73/194 C, 73/255
[51] Int. Cl............................................. G01f 3/08
[58] Field of Search .......... 73/194 R, 194 C, 194 E, 73/194 EM, 199, 255, 253, 3; 251/212

[56] References Cited
UNITED STATES PATENTS
2,518,149  8/1950  Kearsley........................... 73/194 E
3,186,014  6/1965  Allen .................................. 73/3 X FOREIGN PATENTS OR APPLICATIONS
1,252,917  10/1967  Germany ............................ 73/255
4,420,898  2/1966  Japan................................ 73/194 C
1,209,547  10/1970  Great Britain .................... 73/194 E
11,208  6/1903  Great Britain .................... 73/194 R Primary Examiner—Jerry W. Myracle
Assistant Examiner—Stephen A. Kreitman
Attorney, Agent, or Firm—Woodhams, Blanchard & Flynn

[57] ABSTRACT

A flow meter for measuring the flow parameters of liquid, gaseous and multicomponent media is comprised of a housing encompassing a flow chamber through which the medium flows in a swirling movement. The medium entrains therewith a symmetrical ball-shaped sensing element which is positively guided in a closed orbit in the chamber by arranging for the element to contact mutually opposed guide members which are provided in connection with the housing and adapted each to engage a narrow polar cap portion of the ball with a slight clearance, at least one guide member being in the form of a groove.

15 Claims, 19 Drawing Figures

3,861,210
Fig. 1
Fig. 2
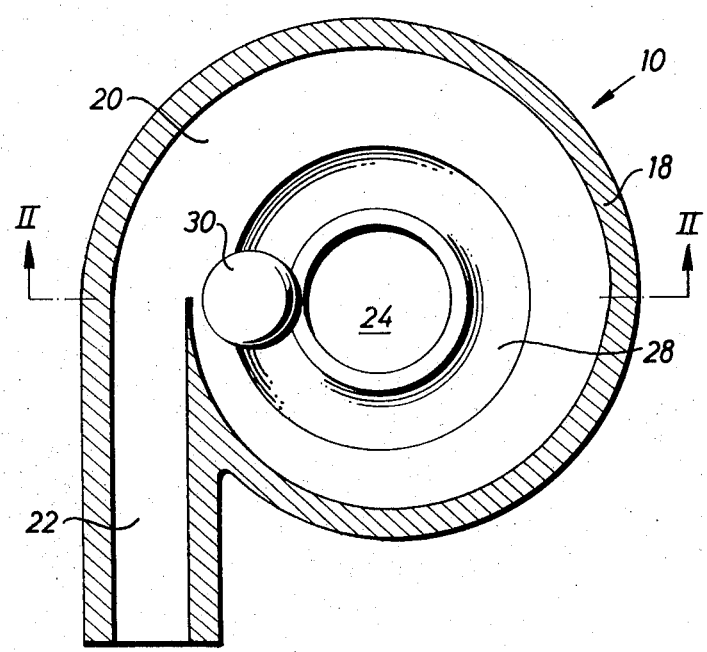
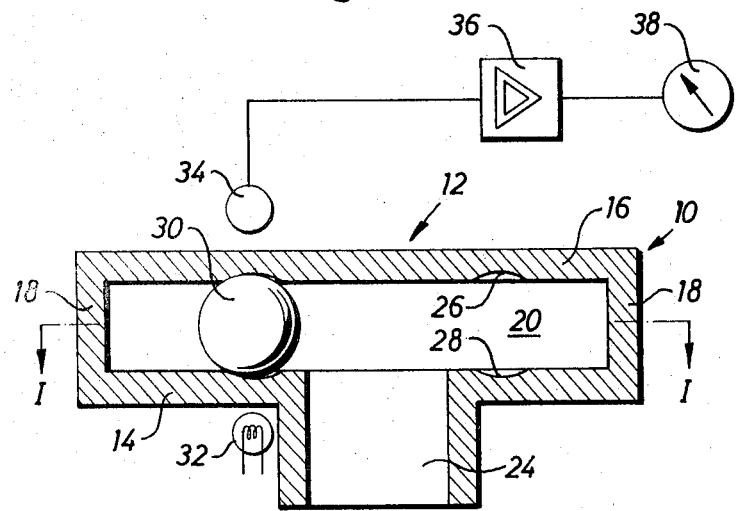

Fig. 3
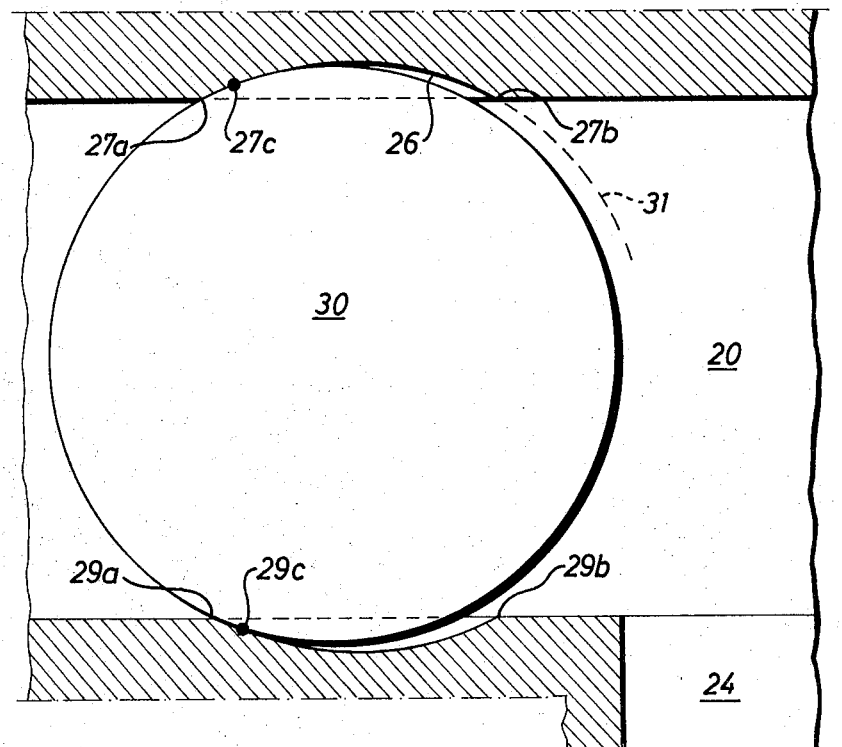
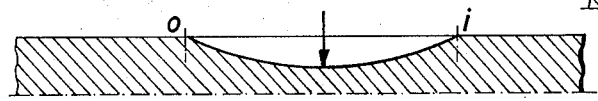
Fig. 3a
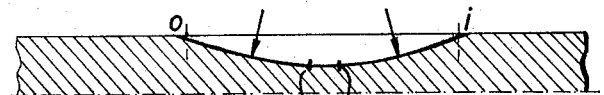
Fig. 3b
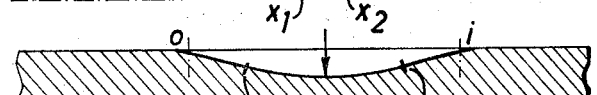
Fig. 3c
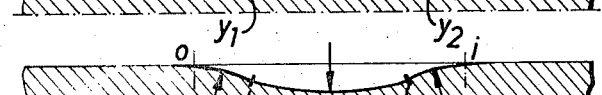
Fig. 3d
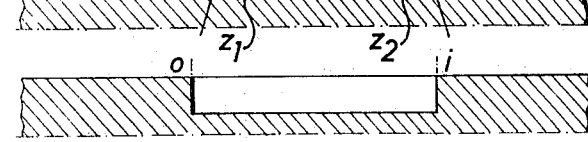
Fig. 3e
Fig. 3f

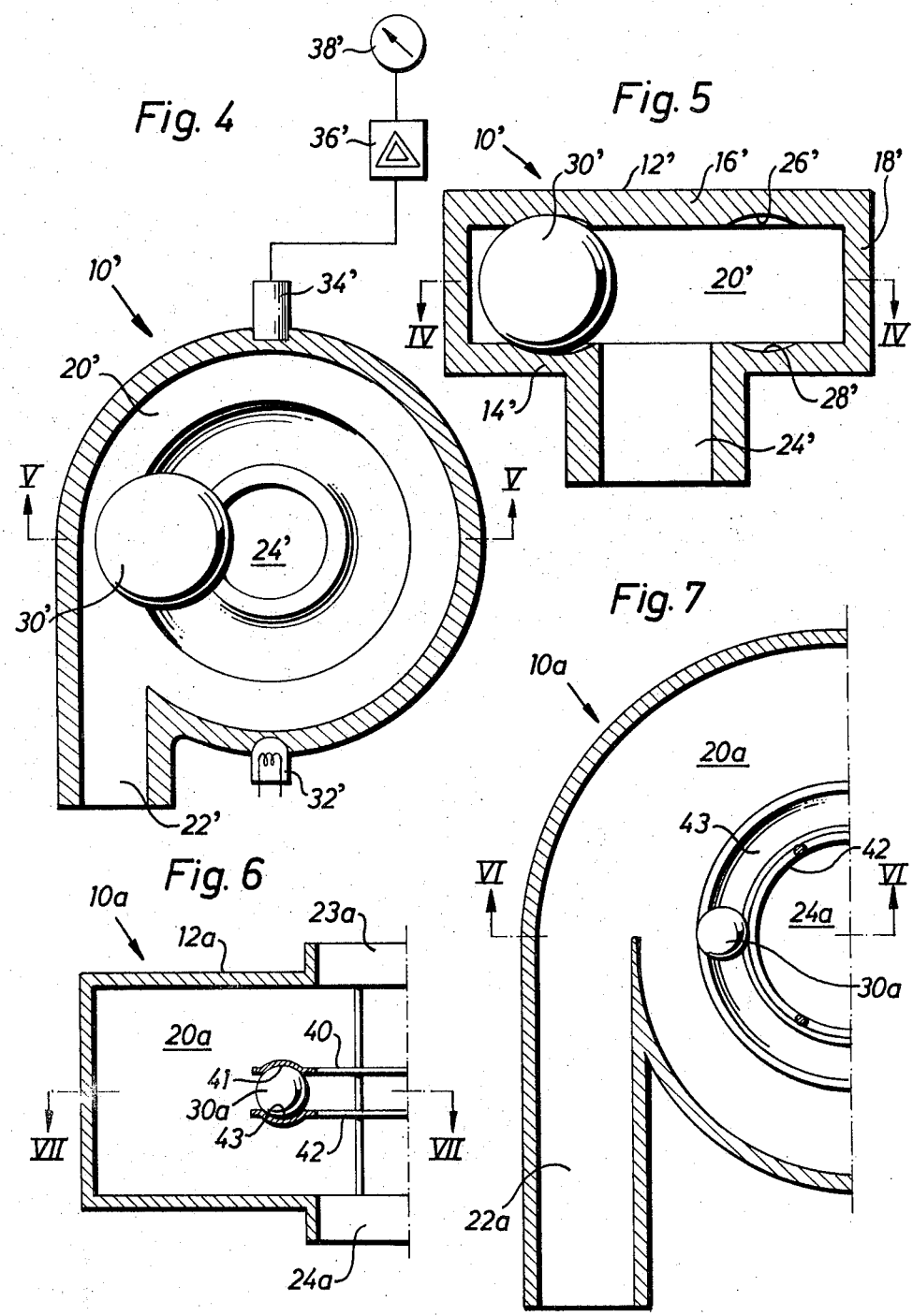

– 1 –

FLOW METER PROVIDED WITH AN ORBITING SENSING ELEMENT

The present invention relates to flow meters, i.e., to devices for measuring the flow parameters of flowing media (continua). By flow parameters is meant the physical magnitudes normally of interest with flowing Newtonian media (e.g., normal liquids and gases), non-Newtonian media (e.g., dyestuffs, etc.) and multi-component media, and such magnitude as, for example, mass transport, volume transport and velocities. The invention is not restricted solely to conventional measuring processes, however, but is also intended for use in controlling and monitoring systems as a transducer element for producing a control signal proportional to the flow parameters of the medium or media concerned.

Flow meters are known with which the medium to be measured is caused to flow tangentially into a circular or annular chamber while being imparted a rotary or circulatory movement. Located in the chamber is a freely movable solid of revolution, normally in the form of a ball, which accompanies the circulating medium in an endless path defined by the walls of the chamber. Movement of the ball in the aforementioned path, or more specifically the speed or RPM at which the ball moves around the path, constitutes a magnitude of measurement proportional to the parameter being measured. The ball movement may be indicated by non-mechanical means, e.g. by photo electron or magnetic-inductive means or the like, information concerning the movement of the ball in the endless path being obtained in digital form. Known flow meters of the aforementioned type, which in most cases are intended for measuring the flow rate of small volumes of media, are encumbered with a number of disadvantages, which are primarily caused by the forced movement of the ball along the walls of the measuring chamber. First, the ball does not move in a stable path around the chamber, but is highly unstable and oscillates between outer, inner, upper and lower contact points with the path. This results in a series of impacts between the ball and the walls of the chamber and a constant change in the skin axis of the ball, giving rise to high level sound and friction, with subsequent heavy wear and an appreciable drop in pressure. Secondly, the necessity of an inner defining wall means that a circular wall extending perpendicular to the radial path of medium flow must be provided, which inhibits outflow of the medium in an undesirable manner and contributes to a high drop in pressure.

The object of the present invention is therefore to provide a bearing-free flow meter of the aforementioned type for measuring the flow rate of any volume of medium and with which the disadvantages associated with know flow meters of this type are eliminated. The object is obtained and a simple and silent (i.e. vibration free) flow meter operating with a high degree of linearity in indication and low pressure drop is provided by ensuring that the flow meter of the invention exhibits the characteristics defined in the accompanying claims.

The invention will now be described with reference to a number of embodiments thereof illustrated in the accompanying drawings, of which FIGS. 1 and 2 illustrate diagrammatically one embodiment of the invention in its simple basic form, FIG. 1 being a cross-sectional view taken through the line I—I in FIG. 2, while FIG. 2 is a cross-sectional view taken through the line II—II in FIG. 1.

FIG. 3 illustrates on a larger scale a portion of the embodiment of FIGS. 1 and 2, to illustrate certain of the elements incorporated therein.

FIGS. 3a — 3f are cross-sectional views on a larger scale through guide grooves provided according to the invention to illustrate, by way of example, various suitable groove profile configurations.

FIGS. 4 and 5 illustrate a second embodiment of the flow meter according to the invention, FIG. 4 being a cross-sectional view taken through the line IV—IV in FIG. 5, while FIG. 5 shows a section taken through the line V—V in FIG. 4.

FIG. 6 is a vertical half-sectional view, showing diagrammatically a third embodiment of the flow meter of the present invention, the section being taken along the line VI—VI in FIG. 7, which in turn is a sectional view taken through the line VII—VII in FIG. 6.

FIGS. 8 and 9 illustrate diagrammatically a fourth embodiment of the invention, FIG. 8 showing a section taken through the line VIII—VIII in FIG. 9, while FIG. 9 shows a section taken through the line IX—IX in FIG. 8.

Figure 12:
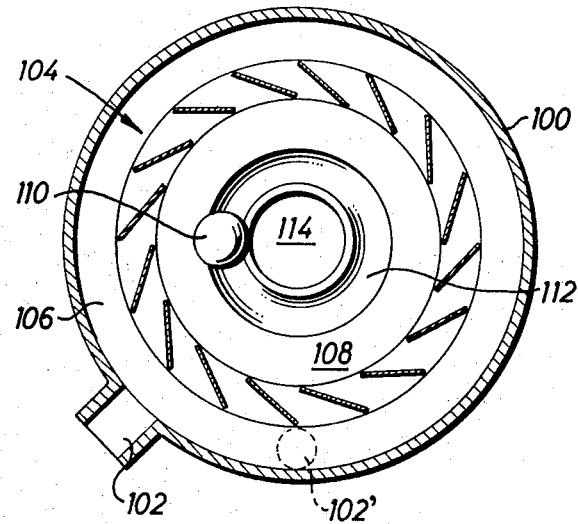
Figure 13:
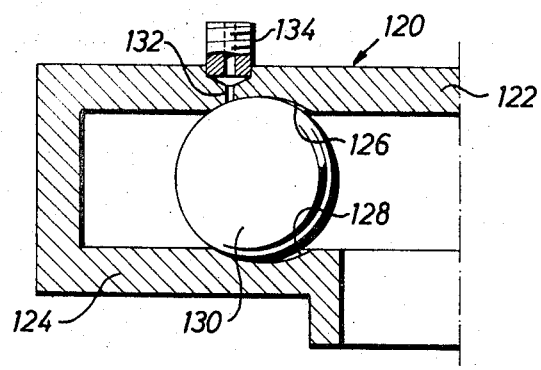

Finally, FIG. 12 is a diagrammatic horizontal section through a seventh embodiment of the invention, while FIG. 13 is a partial section substantially corresponding to FIG. 3 and illustrates how a flow meter constructed according to the invention can produce flow information in the form of pressure signals.

In FIGS. 1-3 there is shown a first embodiment of a flow meter 10 constructed in accordance wtih the invention. The flow meter includes a housing 12 which comprises mainly a bottom or lower wall portion 14 and a cover or upper wall portion 16 arranged parallel to one another and maintained in a predetermined spaced relationship by means of a spiral side or lateral wall 18. The bottom 14, the cover 16 and side wall 18 define together a chamber 20 having a tangentially arranged inlet 22 and a centrally located outlet 24, which may suitably be arranged in the bottom 14. Medium passing into the chamber 20 through the tangentially arranged inlet 22 is imparted a rotary or circulatory movement in a known manner and is simultaneously moved to the centre of the chamber, from where it is discharged through the outlet 24. As regards the design of the chamber 20 it is pointed out that this chamber to advantage may be formed in such a way as disclosed in my copending application Ser. No. 302,021 relating to the configuration of the measuring chamber in flow meters of the type under consideration.

Arranged in the chamber 20 is a sensing element having the form of a symmetrically shaped body of revolution, preferably in the form of a sphere or ball 30 so positioned and arranged as to be activated by the medium flowing in the chamber to follow a substantially circular path in the housing. The ball may be solid or hollow and is suitably made from a material suited to the conditions in question. According to one feature of the invention, the ball 30 is guided in circular, shallow grooves 26 and 28 disposed in the bottom 14 and cover 16 portions respectively of the housing 12. As shown in the Figures, the grooves are located opposite each other so that corresponding segmental or "polar caps" of the ball are able to engage the grooves and follow the same along a circular path in the chamber 20.

FIG. 3 shows on a larger scale a portion of the embodiment illustrated in FIG. 1, to illustrate guiding of the ball 30 in the grooves 26 and 28. The cross-sectional shape of the grooves 26 and 28 may have the form of a segment of a circle, the arcuate shape of which generally coincides with the curvature of the ball while permitting a certain amount of play between the surface of the ball and the defining surfaces of the grooves. As the ball 30 follows the medium circulated in the housing it is subjected to centrifugal force and is also biassed in a radial direction by a force created by the flow. Thus, a radial force equilibrium is maintained with respect to the ball, since the resultant force of the centrifugal force and flow force is balanced by the forces normally exerted by the grooves on the ball. In dependence on the direction in which the resultant force acts, which is determined by the size and mass of the ball, the density of the medium and the rate of flow of the medium, the ball will be urged either radially outwards (the position of the ball shown with full lines in FIG. 3) or radially inwards (the position of the ball marked with dash lines 31). Thus, the ball will follow its circular path in the housing while rolling in point contact on each groove. With the embodiment of FIG. 3, the ball 30 rolls along a circular line in each groove 26 and 28, the line lying closely adjacent the radially outer defining line or edge 27a and 29a of respective grooves, as indicated by contact points 27c and 29c, respectively. With other conditions of size, density and flow, the ball will roll instead along circular lines in the grooves located in the proximity of the radial inner edges 27b and 29b of the grooves. The circulatory or orbiting movement of the ball is thus completely stable and clearly defined, thereby rendering vibrations or deflections in the movement of the ball along its path non-existent.

According to the disclosure above, and as illustrated in FIGS. 3 and 3a the bottom profile of the groove is an arc of a circle, but the profile is in no way limited to this form, as illustrated in FIGS. 3b – 3f. In these Figures the inner edge of the groove is designated $i$ and its outer edge is designated $o$, and thus FIG. 3a shows a continous circular arc extending from $i$ to $o$. In FIG. 3b there is shown a profile configuration composed of two arcs of a circle and an intermediate straight line, thus inflexion or transition points $x_1$ and $x_2$ being formed between said line and the arcs. Conversely, FIG. 3c shows a profile composed of two straight lines and an intermediate circular arc, where the transition points are designated $y_1$ and $y_2$. FIG. 3d shows a profile similar to that of FIG. 3c with two exception that the outer straight lines are replaced by circular arcs having the opposite curvature in relation to the intermediate arc, that is, the groove exhibits between the inflexion points $z_1$ and $z_2$ and the edges of the groove $o$ and $i$, respectively, a slightly convex form contrary to the central area between the inflexion points, which area is concave. FIG. 3e shows the particular case when the profile of the groove is rectangular and in FIG. 3f, finally, a borderline case is illustrated, namely when the one groove has a radius of infinite length, in other words, the ball is guided by means one single groove only, which is preferably provided in the upper end wall of the measuring chamber, whilst the lower end wall is completely plane. Also in this case the ball is compelled to follow a unitarily defined path although its spin axis will be slightly inclined due to the fact that the contact circles of the ball along the groove and the plane surface, respectively, will have different diameters. Thus a certain precession movement is forced upon the ball while orbiting.

As illustrated in FIG. 3, the ball 30 as a whole will follow freely the medium passing through the flow meter, i.e., the ball is totally surrounded by the medium and is subjected to the full effect thereof, in comparison with which the frictional forces caused by the light rolling abutment of the ball with the guide grooves is negligible. Consequently, the ball is extremely sensitive to changes in the flow, and the pressure drop in the flow meter is low. The sensitiveness of the flow meter is further enhanced by the "flow dynamic gear rate" made possible by the arrangement of the guide grooves 26 and 28. The circulatory movement imparted to the medium passing through the chamber 20 obtains a tangential velocity component, which will increase with decreasing radius, i.e., with decreasing distance to the centre of the circulatory movement, as discussed in Thus, the guide grooves 26 and 28 can be selectively constructed in a manner such that the path along the ball moves is of such radius that the spped at which the ball moves along the path is much greater than the speed of the medium being measured as it flows into and out of the flow meter.

The movement of the ball along its path, primarily the number of turns around the path per unit of time or the orbiting rate of the ball, can be determined by anyone of a number of known methods. By way of example only, there is illustrated in FIG. 1 a photoelectric arrangement, which requires that the bottom and cover portions 14 and 16 of the flow meter are completely or partially transparent or provided with transparent windows at suitable position thereon. With the illustrated embodiment, a light source 32 projects a beam of light onto a photocell 34, the beam passing through the housing of the flow meter at a point within the movement path of the ball so as to be broken by the ball once during each revolution. The speed at which the ball orbits in the chamber can be indicated by means of an electronic converter 36 and an indicating instrument, such as an indicator or recorder 38. As previously mentioned, the photo electric indicating means is shown by way of example only and may be replaced by the means of several other methods, such as magnetic, inductive and fluid operative devices.

In FIGS. 4 and 5 a further embodiment of the invention is shown which is particularly useful for very small meters. In general this embodiment is similar to that shown in FIGS. 1 and 2 but differs from this embodiment in that it is provided with a completely circular measuring chamber. Thus this meter 10' comprises a housing 12' composed by a bottom 14' and a side wall 18', preferably integral therewith, and an upper portion or cover 16'. The chamber 20' defined by said member is thus completely circular in plan, and as in the previous embodiment this chamber is provided with a tangential inlet 22' and a central outlet 24'. The chamber 20' receives a sensing element in the form of a ball 30' which is guided, as the ball 30 in the aforegoing embodiment, by shallow grooves 26' and 28' provided in the upper and lower end walls 12' and 14', respectively, of the measuring chamber. The movement of the ball is sensed by means of a photoelectric arrangement similar to that indicated in FIG. 1 and comprising a light source 32', a photocell 34', an electronic converter 36' and an indicating, recording or counting instrument 38'. However, it will be seen in this case that the light source and the photocell are located outside diametrically opposed points of the path of the ball, and the photocell will thus generate two pulses each time the ball completes a revolution in its path.

Further, it is of course not necessary to form the guide grooves in the actual wall portions of the housing; they can also be formed, e.g., in separate annuli or disc members recessed in the end walls, but also in special means arranged in the chamber of the flow meter, as shown in FIGS. 6 and 7. In the embodiment illustrated in FIGS. 6 and 7, a flow meter 10a is constructed in substantially the same manner as the flow meter 10, and has a housing 12a with a measuring chamber 20a, and inlet 22a but double outlets 23a and 24a. As shown in the Figures two rings, an upper ring 40 and a lower ring 42, are mounted in the chamber 20a, to guide the ball 30a along its path. In accordance with the basic feature of the invention, shallow guide grooves 41 and 43 of suitable cross-sectional shape are arranged in the opposing surfaces of respective rings to receive curved portions of the surface of the ball.

Figure 8:
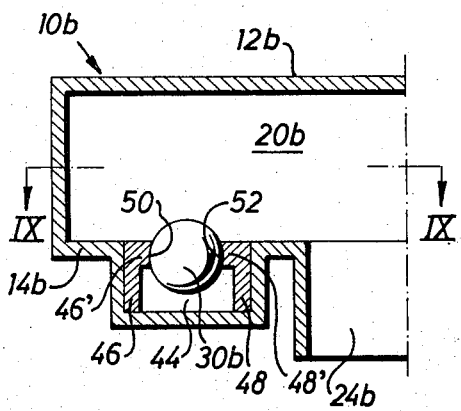
Figure 9:
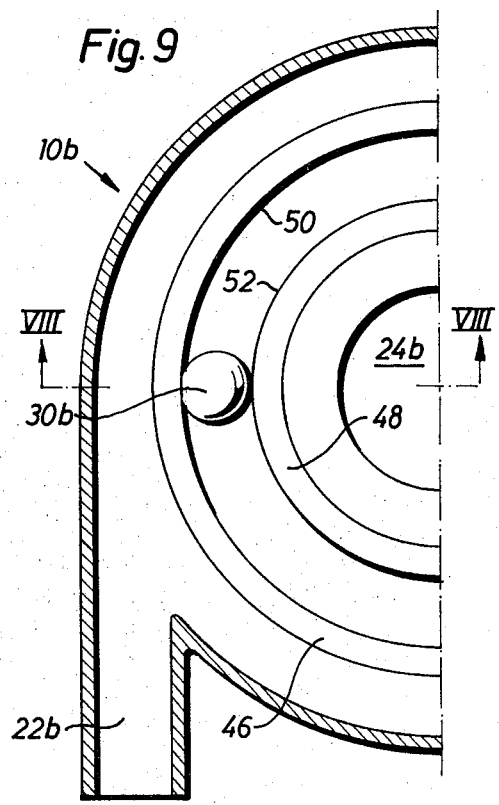

With the embodiments described hitherto, the grooves guiding the ball are formed each in a plane which extends substantially parallel with the movement plane of the medium circulating in the chamber. The ball, however, may be effectively guided along grooves formed in planes which extend at right angles to the plane of flow, i.e., in cylindrical coaxial surfaces. FIGS. 8 and 9 illustrate example of this alternative positioning of the grooves. The embodiment of FIGS. 8 and 9 comprises a flow meter 10b, having a housing 12b which coincides generally with the housing 12a shown in FIGS. 6 and 7 and which encircles a chamber 20b provided with a tangentially extending inlet 22b and a single coaxial outlet 24b. Arranged in the bottom or lower wall portion 14b of the housing 12b is a channel 44 in which is accommodated two guide strips or rings, an outer guide ring 46 and an inner guide ring 48. The rings are provided with mutually facing, low flange portions 46' and 48' respectively, in which are arranged shallow ball guide grooves 50 and 52, the grooves being formed in accordance with the aforedescribed principle so that polar cap portions of the ball are lightly embraced by the grooves. With the embodiment illustrated in FIGS. 8 and 9, however, the grooves 50 and 52 are disposed in coaxial surfaces whose axes coincide with the circulation axis of the flow. Thus, in relation to the circulation plane, the grooves 50 and 52 extend at right angles to the direction in which the groove 41 and 43 shown in FIGS. 6 and 7 extend.

The grooves 50 and 52 have an arcuate cross-sectional shape and preferably a circle-arc cross-sectional shape, and in dependence on the aforementioned conditions of size, density and flow conditions, the ball will either be urged against the outer groove 50 or against the inner groove 52. It should be observed that the ball seeks its stable rolling position around a central circular line on the bottom of respective grooves. Thus, in this instance the ball does not attempt to find the edges of the groove. The illustrated arrangement with the ball partially "submerged" in the bottom of the chamber 20b is shown by way of example only, and it will be readily appreciated that the path followed by the ball can be arranged in another position in the chamber, e.g., even in a position corresponding to the position shown in FIGS. 6 and 7, in such a case there being arranged two concentric rings provided with mutually opposing grooves for receiving and guiding the ball in its path.

Figure 10:
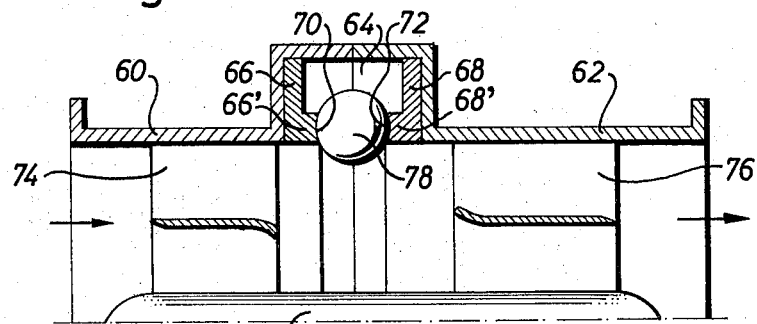
FIG. 10 is a vertical, half-sectional view through a fifth embodiment of the invention.
Figure 11:
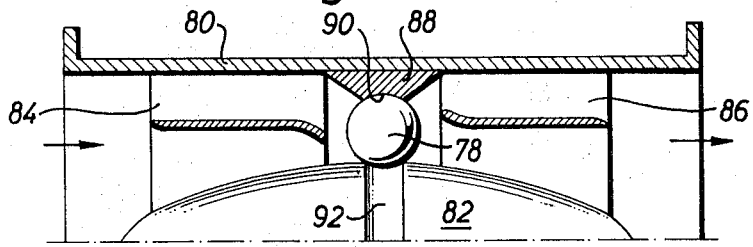
FIG. 11 is a corresponding sectional view through a sixth embodiment of the invention.

FIGS. 10 and 11 illustrate diagrammatically two variations on the flow meter of the present invention, with which the medium being measured is imparted a rotary or circulatory movement while flowing along a straight passage or duct, this movement being detected by an indicating ball arranged to follow suitably arranged grooves in accordance with the invention. The embodiment illustrated in FIG. 10 comprises a housing having an inlet 60 and an outlet 62 consisting mainly of two coaxial cylindrical sleeves which together form a straight flow passage. The ends of the sleeves which lie adjacent each other are provided with flanged portions which define an outer recess or groove 64 in the wall of the passage, in which two guide rings 66 and 68 are arranged. The rings are provided with shallow, mutually opposing flange portions 66' and 68' in which guide grooves 70 and 72 are arranged for a ball 78, as clearly illustrated in FIG. 10. As shown diagrammatically in the Figure, a stationary system of guide vanes 74 is mounted in the inlet 60 and arranged centrally to impart a tangential velocity component to the flowing medium, i.e., to cause the medium to move in rotary or circulatory manner. Mounted in the outlet 62 is a further, fixed system of guide vanes 76, which are arranged to counteract the movement generated by the first system of guide vanes 74. The guide vanes suitably extend from a common central hub 79. The indicating ball follows the rotation component of the movement of the through flowing medium, and the speed of the ball is measured, as previously described.

Similarly to the conditions relevant to the embodiments shown in FIGS. 6 and 7 and FIGS. 8 and 9 the guide grooves of the embodiment of FIG. 10 can be turned through 90°, wherewith a construction is obtained similar to the embodiment shown in FIG. 11. With this latter embodiment, the housing includes one single, undivided cylindrical sleeve 80. A droplet-shaped rotation-symmetrical hub 82 is arranged centrally in the housing and is connected close to its ends with the housing by two fixed guide vane systems 84 and 86, the former being mounted on the inlet side of the housing and arranged to impart rotary movement to the flowing medium, and the latter being arranged on the outlet side of the housing and arranged to counteract said rotary movement. Arranged on the inside of the housing 80, in a suitable position between the guide vane systems is an annular bead 88, while between the bead and the hub 82 is an indicating ball 78, which, similarly to the aforedescribed embodiments, is guided in two shallow, mutually opposing grooves 90 and 92 disposed in the bead 88 and the hub 82, respectively.

FIG. 12 illustrates an embodiment of the invention similar to that shown in FIGS. 1–3, inasmuch as the medium is caused to flow tangentially into a flow measuring chamber and is discharged therefrom through an outlet arranged coaxially therewith. The practical construction of this latter embodiment differs, however, from that of the embodiment according to FIGS. 1–3, since in this instance the flow meter includes an outer, generally circular housing 100 having an inlet 102, which need not be tangentially arranged to the housing but may be arranged radially thereto or axially, as shown by the dotted line 102'. Arranged within the housing, coaxially therewith and at a certain distance from the inner surface thereof, is a fixed system of guide vanes 104. Thus, outside the system of guide vanes there is formed a pressure equalizing chamber 106 for the inflowing medium, which is imparted a tangential movement or circulatory movement by the vanes 104 upon entering a circular chamber 108 located radially inwardly of the vanes. In a manner similar to that previously described, an indicating ball 110 is forced to follow the circulatory movement of the medium guided between grooves arranged in the walls of the housing or in members attached thereto, of which grooves only one, 112, is shown in the Figure. Located inwardly of the movement path of the ball is an outlet 114 extending coaxially with the housing. This embodiment permits greater freedom in the practical construction of the housing, and in particular with respect to the arrangement of its inlet.

In FIG. 13 there is illustrated an embodiment of the flow meter according to the invention which is especially suited for use under conditions where the surrounding environment excludes measurement by electric signal means. Owing to the fact that the indicating ball is guided along fixed grooves in the aforedescribed manner, the flow meter can be readily adapted to produce pressure signals, which can be transmitted to a suitable signal processing system. The embodiment illustrated in FIG. 13 includes a housing 120 which coincides generally with the housing 12 of the embodiment according to FIGS. 1 and 2. Thus, the housing 120 has an upper wall portion or cover 122 and a lower wall portion or bottom 124. Similar to the previous embodiments, grooves, 126 and 128, are disposed in the wall portions of the housing for the purpose of guiding a measuring body, in the form of a ball 130. For the purpose of indicating the movement of the ball there is arranged in at least one of the grooves one or more channels, which open out into the actual grooves, as shown for example with the channel 132. As illustrated, the channel 132 opens out into the groove 126 and each time the ball passes the outh of the channel a pressure pulse is created therein, the pulse being passed via a connection 134 to an indicating system (not shown). Thus, a pressure pulse is generated in the channel 132 with each revolution of the ball 130 and the composite signal obtained with this embodiment will have the form of a train of pulses, similar to the pulses obtained with the previously described embodiments, but of a fluid nature.

All of the aforedescribed embodiments fulfil the object of the present invention, i.e., to provide a simple silent-running flow meter having practically complete linearity and reproduceability and giving but a very low drop in pressure. This result is obtained through the aforedescribed construction principle based on the concept of the invention, namely that the indicating body is arranged to be freely suspended in the flowing medium to the greatest possible extent, i.e., completely covered by the medium, and with which the tangential velocity component of the movement of the medium is proportional to the measured flow parameter. At the same time, the ball is guided in its path under stable conditions in a manner to create the least possible friction, the movement of the ball in its shallow guide grooves being comparable with the movement of the bearing balls in the races of an unloaded ball bearing.

The invention is not restricted to the illustrated and described embodiments, but can be modified within the scope of the following claims.

I claim:

1. In a flow meter for liquid media, gaseous media and multi-component media, both Newtonian and non-Newtonian, including housing means defining a chamber therein and provided with inlet means and outlet means communicating with said chamber and through which a medium is caused to flow to measure or check one or more of its flow parameters, said housing means being so constructed that the medium during its passage through said chamber is imparted at least partially with a circulatory movement, and wherein there is arranged in the chamber a sensing element in the form of a ball which is propelled by the flowing medium along a generally circular path in the chamber, and means arranged to measure the movement of the ball to determine the desired flow parameter, comprising the improvement wherein the ball is arranged to move freely in the direction of the tangential velocity component of the movement of the medium, while being positively and uninterruptedly guided along its circular path by engagement with a pair of spaced and mutually opposed continuous guide members which closely confine the ball therebetween, at least one of said guide members having a shallow guide groove formed therein which opens toward the other guide member, said guide members being fixed relative to the housing means and formed such that a boundary layer flow is permitted thereover without being appreciably disturbed, the guide members being positioned on substantially diametrically opposite sides of the ball and arranged each to engage a narrow polar cap portion of the ball with a slight clearance therebetween such that the ball is positively held between the guide members without any other contact with the surrounding housing means while effecting a clearly definable and stable rolling movement along not more than two predetermined contact circles as defined on the opposed guide members.

2. A flow meter according to claim 1, wherein the guide groove has a profile in the form of an arc of a circle.

3. A flow meter according to claim 1, wherein the guide groove has a profile composed of two circular arcs connected by an intermediate straight line.

4. A flow meter according to claim 1, wherein the guide groove has a profile composed of two straight lines connected by an intermediate circular arc.

5. A flow meter according to claim 1, wherein the guide groove has a profile composed of two outer circular arcs connected by an intermediate circular arc having a radius of curvature opposite the radius of curvature of the outer circular arcs, such that the central portion of the groove bottom is concave whereas the surrounding portions of the groove bottom are convex.

6. A flow meter according to claim 1, wherein the guide groove has a rectangular cross-sectional shape.

7. A flow meter according to claim 1, wherein the guide members comprise the end walls of said housing means and extend substantially parallel with one another and substantially parallel with the circulation plane of the flowing medium.

8. A flow meter according to claim 1, wherein the housing means includes a pair of spaced end walls defining said chamber therebetween, said guide members being provided by two support members mounted on the housing means within the chamber between and spaced from the end walls so as to be freely surrounded by the medium flowing through the chamber, said support members being oriented such that the planes of the guide members extend generally parallel with the circulation plane of the flowing medium.

9. A flow meter according to claim 1, wherein the guide groove communicates with at least one pressure pulse conducting channel which opens outwardly from the groove and is connected with a fluid signal processing system.

10. A flow meter according to claim 1, wherein said housing means includes a pair of generally parallel end walls and a substantially annular sidewall extending between and fixedly connected to said end walls so as to define said chamber therebetween, said chamber being of a generally annular configuration, said outlet means comprising an outlet opening extending substantially coaxially through one of said end walls and communicating with a central portion of said chamber, said end members constituting the guide members and having an annular ringlike shallow guide groove formed therein in substantially concentric relationship to said outlet opening, the guide grooves being formed on the inside surface of said end members in opposed relationship to one another, said ball being positioned between said end walls and disposed for rolling engagement with said opposed pair of grooves so that said ball moves throughout a circular path which is substantially concentric with and surrounds said outlet opening, said grooves as formed in said end walls being spaced radially inwardly a substantial distance from said annular sidewall whereby said ball is continuously maintained out of engagement with and spaced a substantial distance radially inwardly from said annular sidewall, and said inlet opening communicating with said chamber adjacent the outer periphery thereof, whereby the fluid medium flowing into said chamber flows directly into an outer substantially annular portion of said chamber which is spaced radially outwardly from said guide grooves so that the inflowing fluid medium does not directly impinge on said ball.

11. A flow meter according to claim 10, wherein said inlet opening is directed tangentially of said chamber so that an imaginary extension of said inlet opening does not intersect the path of movement of said ball.

12. A flow meter according to claim 11, wherein said annular sidewall includes a wall portion of spiral form extending from the radially outer edge of said inlet opening and spiraling inwardly toward the center of said chamber for causing a swirling motion of said fluid as said medium is supplied to said chamber.

13. A flow meter, particularly for measuring or indicating at least one of the parameters of a flowing medium, comprising housing means including a substantially annular sidewall defining therein a flow chamber having a generally cylindrical shape, said housing means being so constructed that the fluid medium during its passage through said chamber is imparted at least partially with a circulatory movement, inlet means associated with said housing means for permitting said flowing medium to be supplied to said chamber, outlet means associated with said housing for permitting said flowing medium to be discharged from said chamber, said outlet means including an outlet opening communicating with a central portion of said chamber and extending in a direction substantially parallel with the longitudinal axis of said chamber, sensing means disposed within said chamber for indicating at least one of the flow parameters of said flowing medium, said sensing means including a ball positioned within said chamber and propelled by the flowing medium along a generally circular path within said chamber, said ball having a cross-sectional area which is substantially less than the cross-sectional area of said chamber as measured from the longitudinal axis thereof radially outwardly to the surrounding sidewall, and guide means associated with said ball for positively and uninterruptedly guiding said ball around a circular path while permitting free movement of said ball along said path, said guide means including a pair of spaced and mutually opposed continuous guide members fixed relative to said housing means and having said ball disposed therebetween, at least one of said guide members having a shallow ringlike guide groove formed therein, said ringlike groove defining generally a plane which is substantially perpendicular to said longitudinal axis and being spaced radially outwardly so as to substantially encircle said outlet opening, said ball being engaged with the opposed guide members and disposed so that said ball projects into said shallow groove whereby the diametrically opposite narrow polar cap portions of the ball are each disposed in point-like engagement with a respective one of said guide members so that said ball is rolling supported solely for stable rolling movement along two opposed contact circles as defined on the opposed guide members, said guide means maintaining said ball spaced radially inwardly from and continuously out of engagement with said annular sidewall.

14. A flow meter according to claim 13, wherein said shallow groove has a depth which is extremely small in comparison to the radius of said ball.

15. A flow meter according to claim 14, wherein said pair of guide members comprise a pair of housing end walls which are disposed in substantial parallel relationship to one another and are fixedly connected to said annular sidewall which extends therebetween, said outlet opening being formed substantially centrally within one of said end walls so as to be substantially coaxially aligned with the longitudinal axis of said chamber, and each of said end walls having a relatively smooth inner surface and each having a shallow ringlike annular groove formed therein, the grooves on said opposed end walls being disposed directly opposite one another and concentric with and in surrounding relationship to said outlet opening, and the depth of each of said grooves being a small fraction of the radius of said ball, said grooves being spaced radially inwardly a substantial distance from said annular sidewall for positively preventing said ball from moving into engagement with said sidewall.

* * * * *